(12) United States Patent
Teoh (10) Patent No.: US 8,517,047 B2
(45) Date of Patent: Aug. 27, 2013

(54) RAINWATER REGULATING SYSTEM

(75) Inventor: Soo Teoh, Mill Creek, WA (US)

(73) Assignee: Soo Hean Teoh, Mill Creek, WA (US)

( * ) Notice: Subject to any disclaimer, the term of this patent is extended or adjusted under 35 U.S.C. 154(b) by 390 days.

(21) Appl. No.: 12/791,110

(22) Filed: Jun. 1, 2010

(65) Prior Publication Data

US 2011/0290355 A1    Dec. 1, 2011

(51) Int. Cl.
*E04D 13/08* (2006.01)

(52) U.S. Cl.
USPC ............... 137/357; 137/873; 137/875; 52/16; 210/170.03

(58) Field of Classification Search
USPC ................. 137/121, 356, 357, 872, 873, 875, 137/876; 52/16; 210/170.03
See application file for complete search history.

(56) References Cited

U.S. PATENT DOCUMENTS

| | | | | |
|---|---|---|---|---|
| 334,386 A * | 1/1886 | Hough et al. | .................. | 210/428 |
| 371,697 A * | 10/1887 | Miller | .......................... | 210/421 |
| 542,934 A * | 7/1895 | Kleespies | ...................... | 210/421 |
| 949,972 A * | 2/1910 | Burgert | ........................ | 210/421 |
| 4,182,376 A * | 1/1980 | Nilsson | ........................ | 137/874 |
| 4,386,484 A * | 6/1983 | van Berne et al. | ................. | 52/16 |
| 4,428,394 A * | 1/1984 | Wright | .......................... | 137/122 |
| 4,726,151 A * | 2/1988 | Vitale | ................. | 52/16 |
| 5,114,594 A | 5/1992 | Rosebrock et al. | | |
| 5,533,303 A * | 7/1996 | Harvey | .................. | 52/16 |
| 5,681,455 A * | 10/1997 | Takai et al. | ................... | 210/154 |
| 5,863,151 A * | 1/1999 | Chapotelle | .................... | 405/52 |
| 6,240,680 B1 * | 6/2001 | Estes | ................. | 52/16 |
| 2008/0086953 A1 * | 4/2008 | Graf | ................. | 52/12 |

FOREIGN PATENT DOCUMENTS

WO    WO2008000016    1/2008

\* cited by examiner

*Primary Examiner* — John Fox
*Assistant Examiner* — Kevin Murphy (57) ABSTRACT

A rainwater regulating system is described. An object of this invention to provide an attachment for rain gutters that allows for easy collections of rainwater into a rain barrel. It is another object of the invention to provide a gutter attachment that does not need to be removed in cold weather. It is yet another object of this invention to provide a gutter attachment that screens out debris from water prior to allowing water to enter the water barrel; said debris can be easily cleaned without removing the attachment or disturbing the barrel. It is another objective of the invention to provide a gutter attachment that allows overflow to easily flow through the gutter without causing structural damage to either the barrel or the gutter.

2 Claims, 7 Drawing Sheets

RAINWATER REGULATING SYSTEM

CROSS-REFERENCES TO RELATED APPLICATIONS STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

Since the dawn of man, we have been collecting rainwater for drinking, washing and, farming. Primitive man collected rainwater in banana leaves or excavated cisterns. As man evolved our methods of collecting water became more and more complex.

Although those who live in parts of the world that have limited water resources have continued to harvest water for individual use, most of us have not. As men became city dwellers, we became more dependent on provincial governments for collecting and distributing water for our needs. Man did not have to think twice about water unless there was a shortage. Water shortages because of drought, natural or man-made, can create havoc.

The easiest method for collecting rainwater is using a rain barrel or other catchment systems. Typically, rainwater is caught and stored when it runs off from rooftops via rain gutters. In some cases rain barrels have large opening on top allowing water from gutters to fall into the barrel. The water from these types of barrels is susceptible to pollution such a falling leaves, bugs, or stray animals. Moreover, water collected this way cannot be channeled back to the downspout. Consequently, when the rain barrel is full it will overflow causing the accumulation of unwanted water at rain barrel footing. The accumulated rainwater can seep into a building's foundation or basement resulting in structure damage.

Newer rain barrels try to address this issue by defining a smaller opening. To use this type of rain barrel, the gutter downspout is usually fitted with an attachment that leads a hose to the rain barrel. This type of attachment must be removed in freezing weather otherwise, the water in the rain barrel as well as in the attachment freezes causing both to burst. Additionally, this type of attachment can become clogged with debris if they are not regularly monitored. Finally, the downspout attachments, discussed above, often requires the existing gutter or drain spout to be redesigned.

Information relevant to addressing some of the concerns described above can be found in Adamson (WO2008/000016). However, Adamson is lacking. First, Adamson addresses the freezing problem, discussed above, by removing the apparatus. Second, the filter on Adamson is placed directly below the cut-away downspout. Consequently, any debris coming out from the downspout will be pushed against the filter instead of being pushed away from the filter. This configuration promotes clogging at the filter. Finally, this apparatus is not covered above the filter. Presumably, water is coming into the filter is moving at a high velocity. The size of the filter area coupled with rushing water will cause water to splash onto the exterior wall of the building. The amount of water that is splashed will be magnified when the filter is clogged, resulting in structural damages to the building.

Rosebrock (U.S. Pat. No. 5,114,594) has also tried to addresses a few of the concerns raised above. Rosebrock teaches a rain diverter that allows water to enter into a barrel or bypass the barrel when the barrel is full, the by-passed water flow out through its normal flow channel. Like Adamson, the Roseburg apparatus can freeze in cold temperatures. Additionally, Rosebrock does not provide a filtration system.

BRIEF SUMMARY OF THE INVENTION

It is an object of this invention to provide an apparatus that is attached to existing rain gutters having a downspout system which: (1) allows easy collection of rainwater into a rain barrel with minimal maintenance; (2) has a user activated collection bypass where, the bypass prevents freezing of the apparatus in freezing temperatures; (3) screens out debris from rainwater; (4) can self-clean debris from its filter; and; (5) allows automatic overflow of excessive water from rain barrel back to the downspout.

BRIEF DESCRIPTION OF THE SEVERAL VIEWS OF THE DRAWINGS

Other features and advantages of the present invention will become apparent in the following detailed descriptions of the preferred embodiment with reference to the accompanying drawings, of which.

DETAILED DESCRIPTION OF THE INVENTION

In the description of the invention above and in the detailed description of the invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. Referring now in detail to the FIGS. 1 through 6, wherein the same numbers are used where applicable, a rainwater regulating device (hereinafter "Regulator") is described in accordance with an embodiment of the invention is identified generally as the reference number 100. While in the preferred embodiment, the Regulator is made of a plastic material, it will be understood that it is within the scope of present invention to construct these components from other materials.

Figure 1:
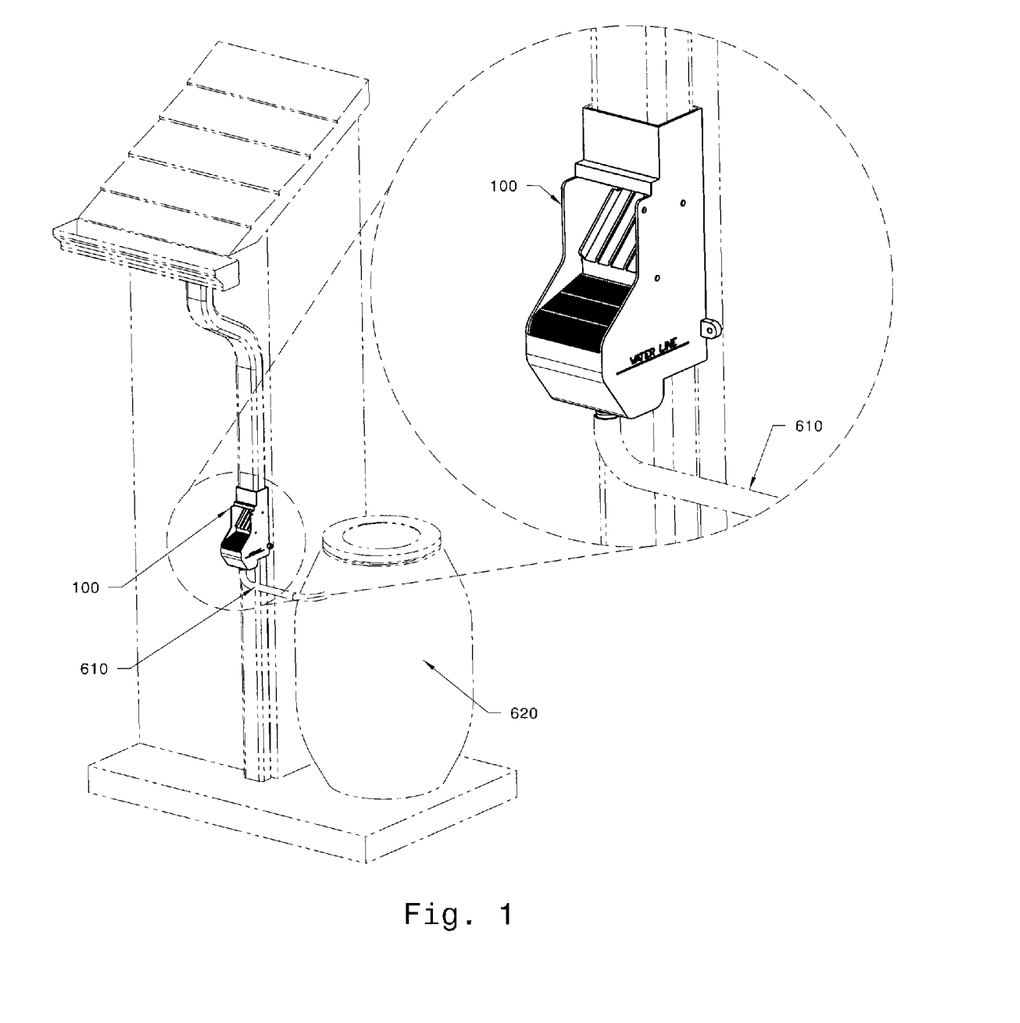
FIG. 1 is a view of the invention installed to a downspout with hose connection to a rain barrel.

Referring to FIG. 1, the Regulator (100) is generally shaped as a hopper (100). However, it will be obvious to a person having ordinary skill in the art that the Regulator (100) can take on other shapes.

Figure 2A:
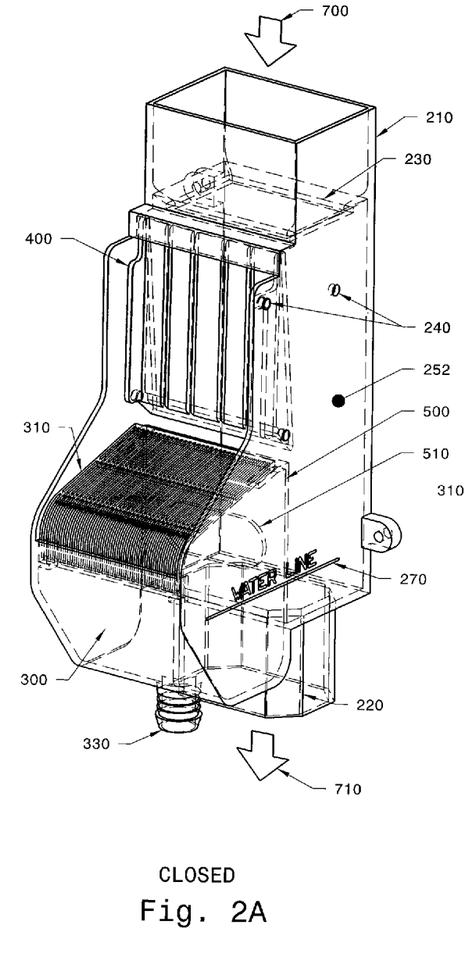
FIG. 2A is an isometric view of the invention in the closed position when water collection is bypassed.
Figure 2B:
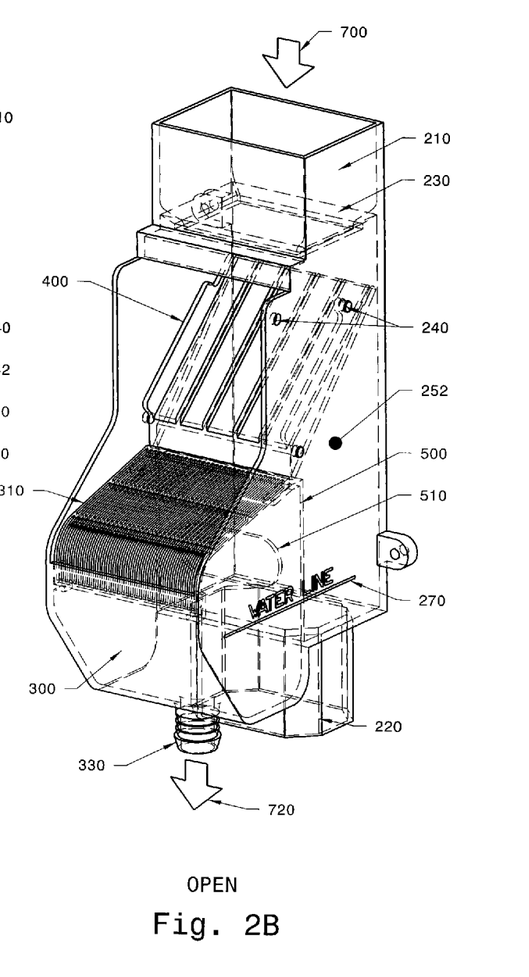
FIG. 2B is an isometric view of the invention in the open position when water collection is activated.
Figure 3A:
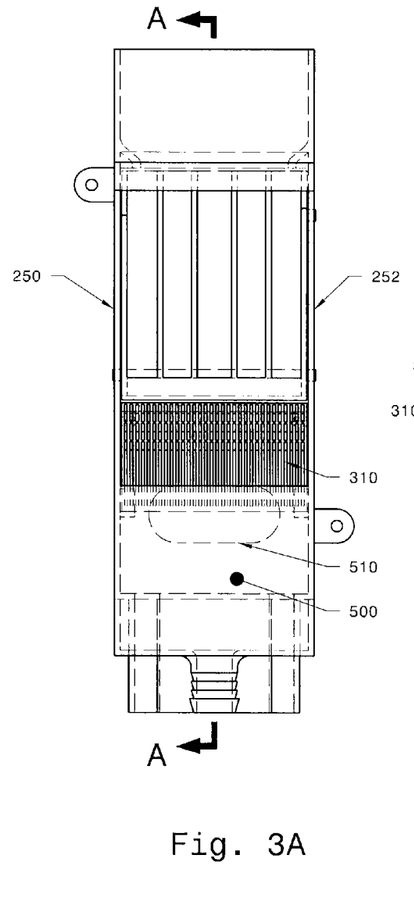
FIG. 3A is a front view of the invention from which section A-A is taken.
Figure 3B:
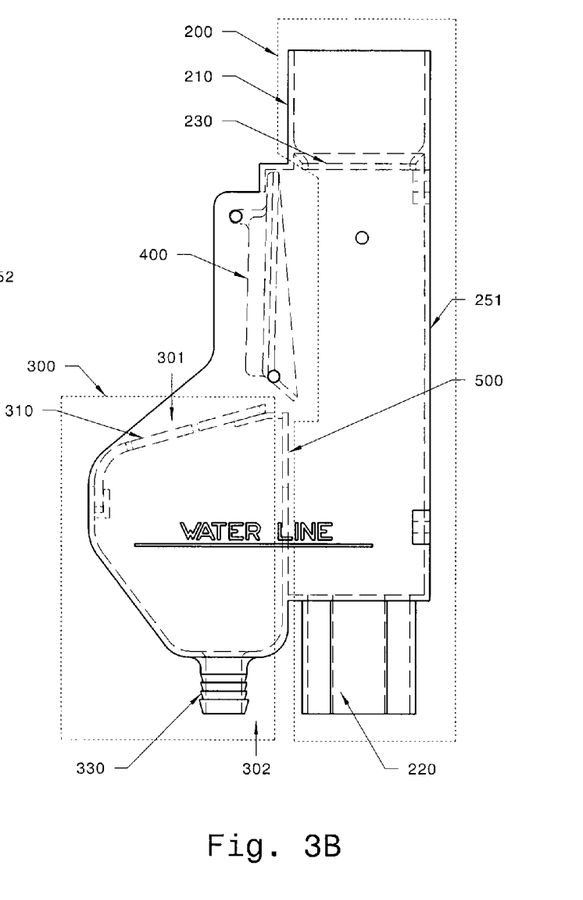
FIG. 3B is a side view of the invention.

Referring to FIG. 3B, the Regulator (100) is comprised of two compartments: a downspout compartment (200) and a reservoir compartment (300). The compartments are separated by a deflector (400) and a mid wall (500). The Regulator also comprises two side walls (250, 252). The defector (400) is pivotally attached to the side walls (250, 252) above the mid wall (500). The downspout compartment (200) is also comprised of a back wall (251). The back wall (251) and the deflector (400) and the mid wall (500) define the downspout compartment (200). Referring to FIGS. 2A and 2B, the deflector (400) has two positions—open and closed.

The downspout compartment (200) also comprises a water input end (210) and a water output end (220). In its preferred embodiment, the water input end (210) will accept a building downspout (701). Dispersed between the water input end (210) and water output end (220) is a venturi (230).

Referring to FIG. 4A through 5B, the purpose of the venturi (230) is two-fold. First, the venturi (230) prevents the downspout (701) from protruding into the deflector (400) when the deflector (400) is in the open position. Second, the venturi (230) assures that rainwater is directed away from the inner walls of the Regulator (100). When the deflector (400) is in the open position, the venturi (230) directs rainwater towards the centre of the deflector (400) and the deflector (400) directs the rainwater into the reservoir compartment (300), maximizing rainwater collection. When the deflector (400) is in the closed position, the venturi (230) keeps the rainwater within the downspout compartment (200) minimizing rainwater from seeping into the reservoir compartment (300).

Referring to FIGS. 3A through 3B, the reservoir compartment (300) comprises a top side (301) and a bottom side (302). The top side (301) comprises a screen (310) and the bottom side (302) comprises a spout (330). The screen (310) is attached to the hopper (100) at an angle.

When the deflector (400) is in the closed position, rainwater flows from downspout (700) through the input end (210) and out the output end (220) through the downspout compartment (710). Preferably, the closed position would be used when rainwater collection is undesirable; for example, during the winter when standing rainwater can freeze and cause damage to rain barrel (620). When the deflector (400) is in the open position, rainwater from the downspout (700) is channeled by the deflector (400) to the reservoir compartment (300) where it is accumulated before being sent to rain barrel through the spout (330, 720).

Figure 6:
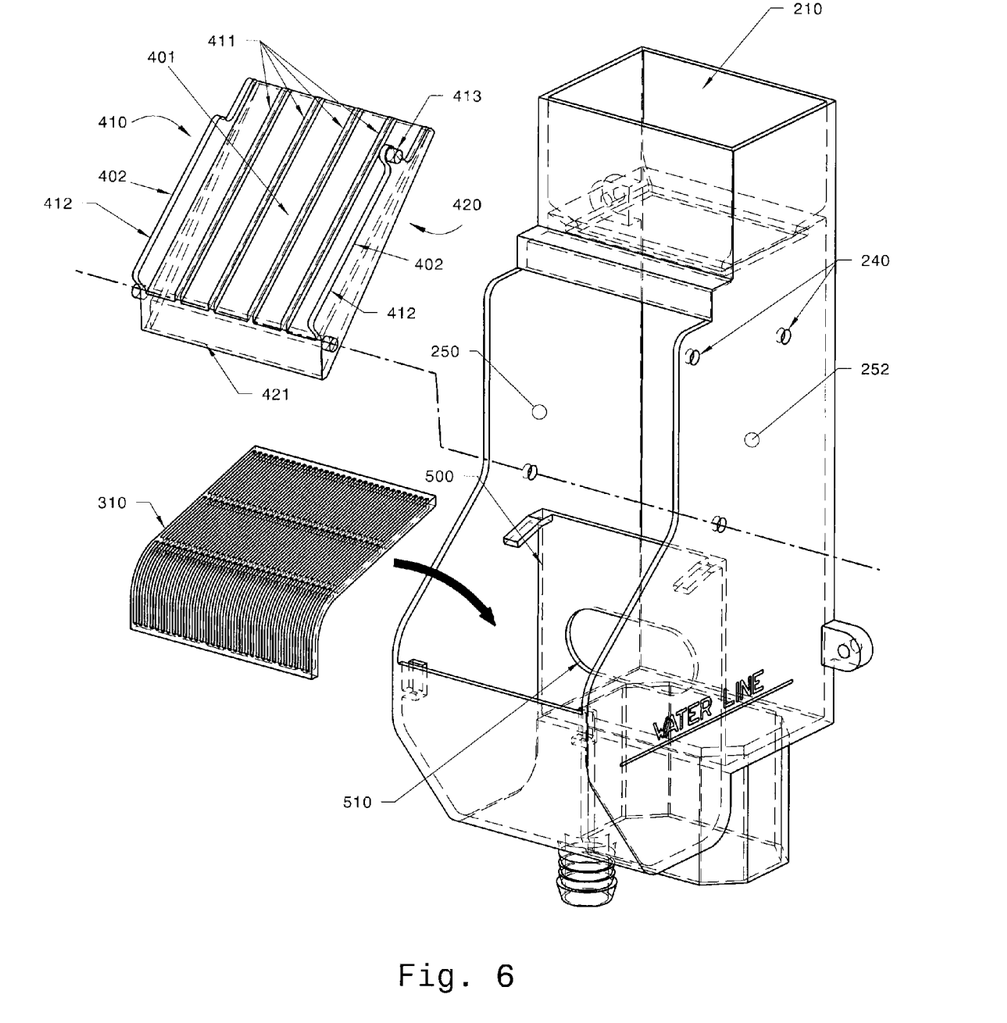
FIG. 6 is an isometric view of the invention showing parts being disassembled.

In the preferred embodiment, a hose (610) is connected to the spout (330) allowing rainwater to be efficiently directed into a rain barrel. However, it will be obvious to a person having ordinary skill in the art that the Regulator (100) can also be used without a hose. Referring to FIG. 6, the deflector (400) comprises of a reservoir side (410) and downspout side (420). The deflector (400) further comprises a central section (401) and at least two edges (402).

The reservoir side (410) of the deflector (400) comprises a plurality fins (411) located on the center section (401) of the deflector and one fin (412) located on each edge (402). The fins (412) located on the edges (402) are larger than the fins (411) located in the center section (401). The Regulator (100) has a means to lock the deflector (400) it in the open position and the closed position. In a preferred embodiment the fins (412) comprise at least one pin (413) and the side wall (252) defines a plurality of holes (240). The plurality of holes (240) accepts the at least one pin (413) locking the defector (400) in the open or closed position.

When the deflector (400) is in the open position, the fins (411, 412) are used to regulate the flow of water towards the screen (310). The larger fins (412) on each edge (402) also prevent rainwater from flowing down the inner sidewalls (250, 252) of the downspout compartment (200). The force of the rainwater through the angle of the deflector (400) and through the fins (411, 412) pushes debris off the angled screen (310).

Figure 4A:
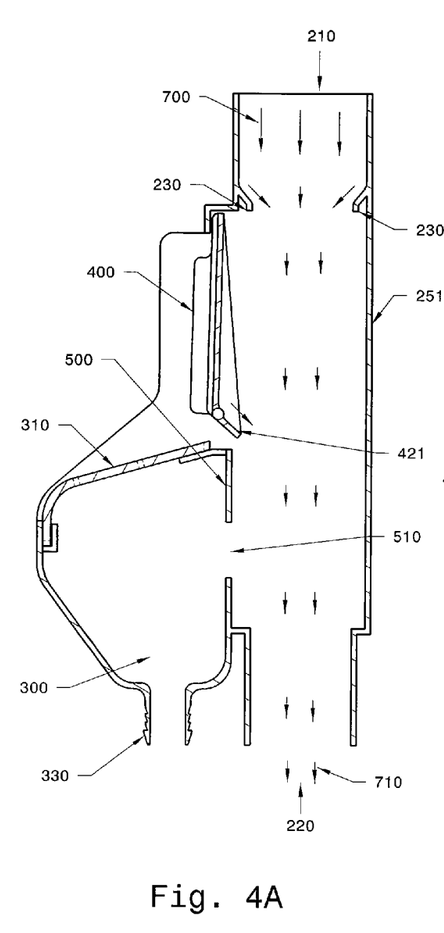
FIG. 4A is section A-A in the closed position when water collection is bypassed.
Figure 4B:
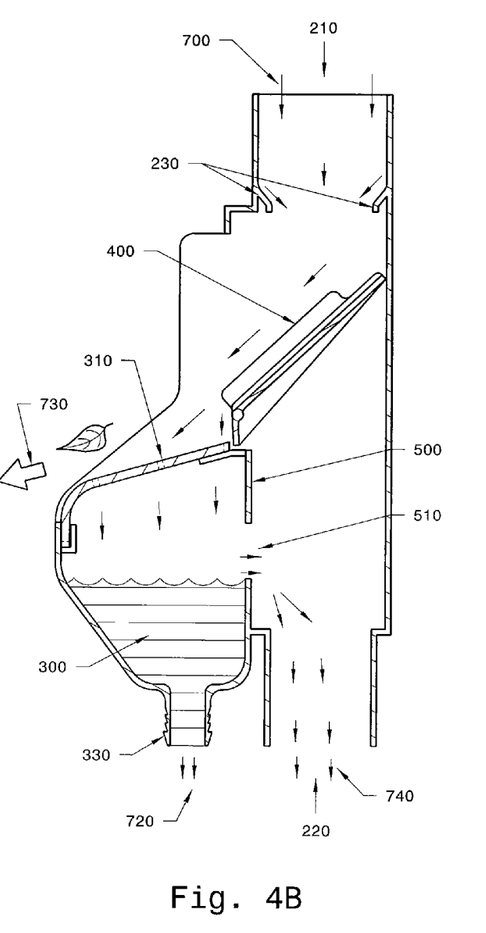
FIG. 4B is section A-A is the open position when water collection is activated.

FIG. 4B shows the flow of debris (730) off the Regulator (100). In the preferred embodiment, the angle of the deflector (400) is similar to the angled screen (310). Referring to FIG. 4A, the downspout side (420) of the diverter (400) also comprises a water diversion flange (421). When the deflector (400) is in the closed position, this flange (421) directs water towards the back wall (251), keeping rainwater away from the reservoir compartment (300).

The mid wall defines a hole (510). When the reservoir compartment (300) is full, the hole (510) allows rainwater to flow from reservoir compartment (300) to downspout compartment (200). The reservoir compartment (300) is considered full when rainwater has reached the level of the hole (510); this level is referred to as the water line (270).

Figure 5A:
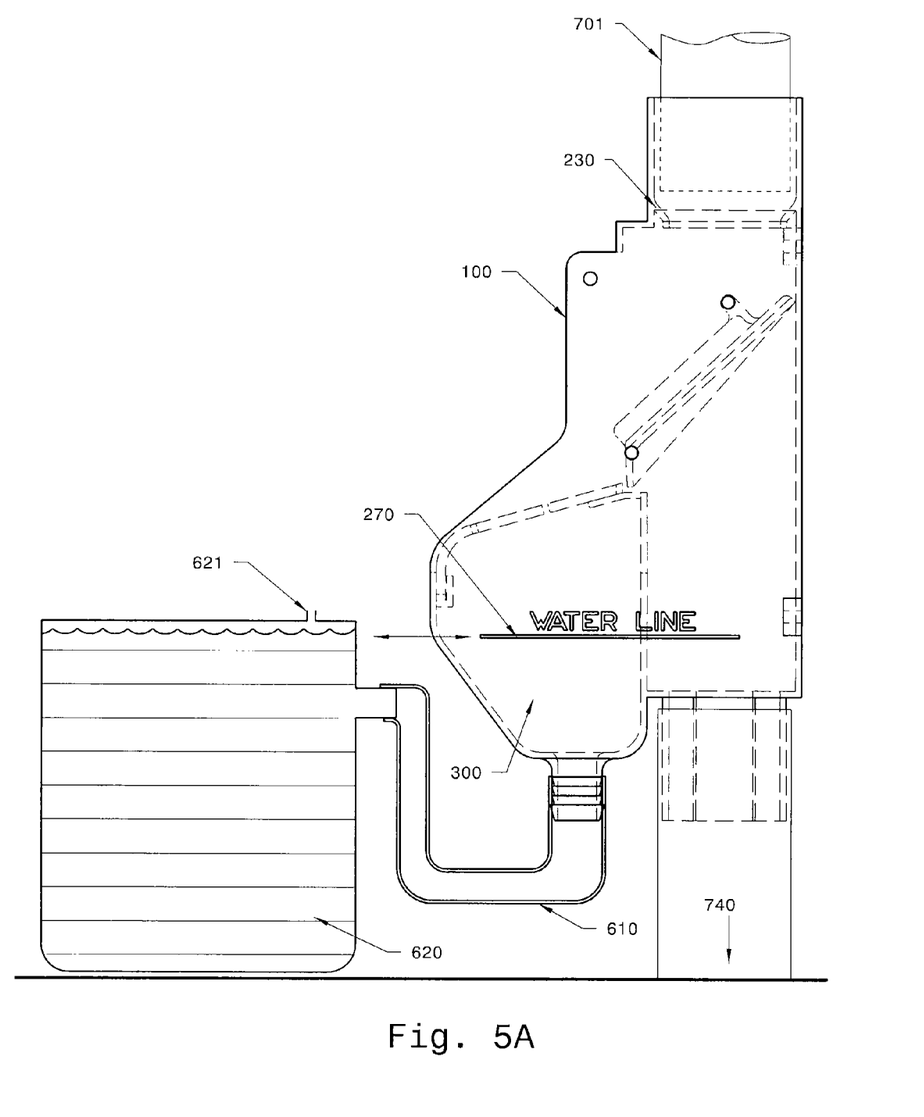
FIG. 5A is a side view of the invention installed using self-leveling connection method.
Figure 5B:
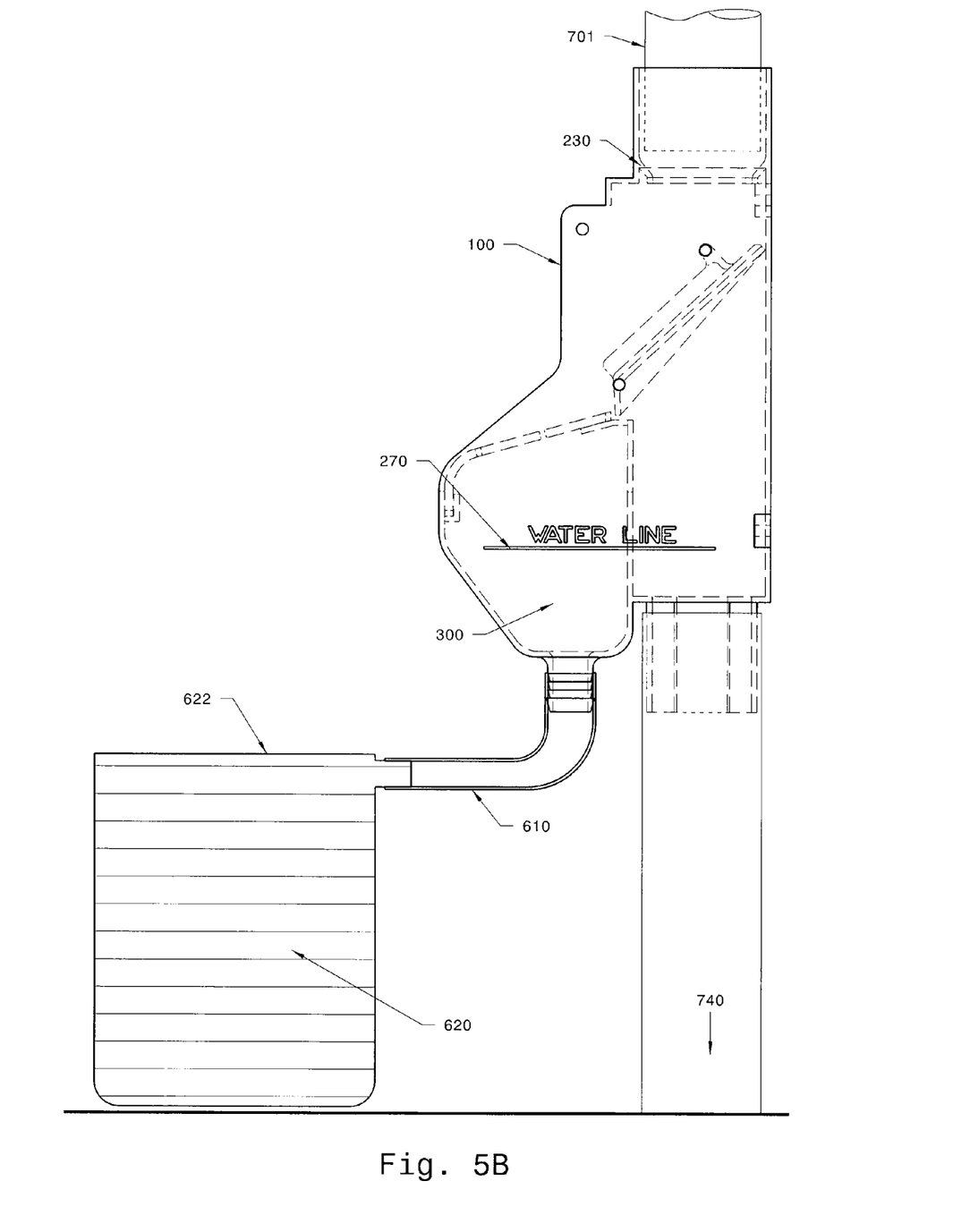
FIG. 5B is a side view of the invention installed using back-pressure connection method.

If the spout (330) delivers water to a rain barrel via a hose (610), as shown in FIGS. 5A and 5B, pressure resulting from a full barrel, will cause the reservoir compartment (300) to become full.

Referring to FIG. 5A, in a preferred attachment method, the Regulator (100) is connected to a rain barrel so that the water line (270) is approximately one inch below the top of the rain barrel (620). A small hole (621) is created at the rain barrel lid to vent air/pressure out of the barrel as it is filled and consequently, there is no pressures build-up inside the rain barrel. Consequently, rainwater can flow freely through the hose (610) into the rain barrel until the barrel is filled. When the rainwater level in the barrel reaches the water line (270), excess water overflows through the hole (510) back to the downspout (740).

Referring to FIG. 5B, in another preferred attachment method, the Regulator (100) is installed at any level above the top of rain barrel (620). Here, the rain barrel has a sealed top (622) so that when the barrel is full, no water flows out from the rain barrel. Instead, the rainwater is backs-up through the hose (610) into the reservoir compartment (300).

What is claimed is:

1. A rainwater regulating system, comprising:
   a downspout compartment comprises a water input end and a water output end, the water input end accepts an upper portion of a cut downspout and the water output end is to be inserted into a lower portion of the cut downspout, the inner surface of the water input end includes a venturi to direct water towards the center of the downspout compartment;
   a reservoir compartment next to the downspout compartment comprises an angled screen on top and at least a spout at the bottom, the angled screen is positioned sloping down and outwardly with a debris exit at the end;
   a mid wall at the lower portion between the reservoir compartment and downspout compartment, the mid wall includes a hole allowing water to flow from the reservoir compartment to the downspout compartment;
   a deflector pivoted above the mid wall used to channel water through the downspout compartment or into the reservoir compartment;

wherein when the deflector is pivoted towards the downspout compartment, the angle of the deflector is substantially parallel with the angled screen directing the flow of water in a down and outwardly direction pushing debris on the angled screen off the rainwater regulating system;

wherein the deflector is pivoted substantially at a first end of the deflector, the first end of the deflector being provided adjacent to the angled screen.

2. The rainwater regulating system of claim 1, wherein: when the deflector is in a vertical position, the deflector forms a wall between the downspout compartment and reservoir compartment.

\* \* \* \* \*